(12) United States Patent
Thomas

(10) Patent No.: US 8,189,603 B2
(45) Date of Patent: May 29, 2012

(54) PCI EXPRESS TO PCI EXPRESS BASED LOW LATENCY INTERCONNECT SCHEME FOR CLUSTERING SYSTEMS

(76) Inventor: Mammen Thomas, San Jose, CA (US)

( * ) Notice: Subject to any disclaimer, the term of this patent is extended or adjusted under 35 U.S.C. 154(b) by 739 days.

(21) Appl. No.: 11/242,463

(22) Filed: Oct. 4, 2005

(65) Prior Publication Data
US 2007/0098001 A1    May 3, 2007

(51) Int. Cl.
*H04L 12/56* (2006.01)
(52) U.S. Cl. ....................................................... 370/401
(58) Field of Classification Search .......................... None
See application file for complete search history.

(56) References Cited

U.S. PATENT DOCUMENTS

| | | | |
|---|---|---|---|
| 5,805,597 A * | 9/1998 | Edem | 370/445 |
| 5,859,844 A * | 1/1999 | Kanno et al. | 370/422 |
| 5,920,545 A * | 7/1999 | Rasanen et al. | 370/229 |
| 6,108,739 A * | 8/2000 | James et al. | 710/113 |
| 6,260,092 B1 * | 7/2001 | Story et al. | 710/315 |
| 6,362,908 B1 * | 3/2002 | Kimbrough et al. | 398/164 |
| 6,615,306 B1 * | 9/2003 | Ajanovic | 710/305 |
| 7,000,037 B2 * | 2/2006 | Rabinovitz et al. | 710/71 |
| 7,058,738 B2 * | 6/2006 | Stufflebeam, Jr. | 370/389 |
| 7,145,866 B1 * | 12/2006 | Ting et al. | 370/228 |
| 7,151,774 B1 * | 12/2006 | Williams et al. | 370/422 |
| 7,457,322 B1 * | 11/2008 | Flood et al. | 370/503 |
| 2003/0099247 A1 * | 5/2003 | Toutant et al. | 370/401 |
| 2003/0123461 A1 * | 7/2003 | Riley | 370/401 |
| 2003/0158940 A1 * | 8/2003 | Leigh | 709/226 |
| 2003/0188079 A1 * | 10/2003 | Singhal et al. | 710/313 |
| 2004/0083323 A1 * | 4/2004 | Rabinovitz et al. | 710/315 |
| 2004/0083325 A1 * | 4/2004 | Rabinovitz et al. | 710/315 |
| 2004/0170196 A1 * | 9/2004 | Susnow | 370/503 |
| 2005/0147119 A1 * | 7/2005 | Tofano | 370/466 |
| 2006/0015537 A1 * | 1/2006 | Marks | 707/200 |
| 2006/0050693 A1 * | 3/2006 | Bury et al. | 370/389 |
| 2006/0088046 A1 * | 4/2006 | Wong et al. | 370/413 |
| 2006/0098659 A1 * | 5/2006 | Chinner | 370/394 |
| 2006/0101185 A1 * | 5/2006 | Kapoor et al. | 710/308 |
| 2006/0114918 A1 * | 6/2006 | Ikeda et al. | 370/408 |
| 2006/0143311 A1 * | 6/2006 | Madukkarumukumana et al. | 710/1 |
| 2006/0206655 A1 * | 9/2006 | Chappell et al. | 710/315 |
| 2006/0251096 A1 * | 11/2006 | Metsker | 370/422 |

* cited by examiner

*Primary Examiner* — Chirag Shah
*Assistant Examiner* — Joshua Smith

(57) ABSTRACT

PCI Express is a Bus or I/O interconnect standard for use inside the computer or embedded system enabling faster data transfers to and from peripheral devices. The standard is still evolving but has achieved a degree of stability such that other applications can be implemented using PCIE as basis. A PCIE based interconnect scheme to enable switching and interconnection between external systems, such that the scalability can be applied to enable data transport between connected systems to form a cluster of systems is proposed. These connected systems can be any computing or embedded system. The scalability of the interconnect will allow the cluster to grow the bandwidth between the systems as they become necessary without changing to a different connection architecture.

13 Claims, 2 Drawing Sheets

A Cluster enlargement using switch to switch interconnect

A Cluster enlargement using switch to switch interconnect

PCI EXPRESS TO PCI EXPRESS BASED LOW LATENCY INTERCONNECT SCHEME FOR CLUSTERING SYSTEMS

FIELD OF INVENTION

This invention relates to cluster interconnect architecture for high-speed and low latency information and data transfer between the systems in the configuration.

BACKGROUND AND PRIOR ART

The need for high speed and low latency cluster interconnect scheme for data and information transport between systems have been recognized as one needing attention in recent times. The growth of interconnected and distributed processing schemes have made it essential that high speed interconnect schemes be defined and established to provide the speed up the processing and data sharing between these systems.

There are interconnect schemes that allow data transfer at high speeds, the most common and fast one existing today is the Ethernet connection allowing transport speeds from 10 MB to as high as 10 GB/sec. TCP/IP protocols used with Ethernet have high over head with inherent latency that make it unsuitable for some distributed applications. Effort is under way in different areas of data transport to reduce the latency of the interconnect as this is a limitation on growth of the distributed computing power.

What is Proposed

PCI Express (PCIE) is an emerging I/O interconnect standard for use inside computers, or embedded systems that allow serial high speed data transfer to and from peripheral devices. The typical PCIE provides 2.5 GB transfer rate per link (this may change as the standard and data rates change). Since the PCIE standard is starting become firm and used within the systems, what is disclosed is the use of PCIE standard based peripheral to PCIE standard based peripheral connected directly using data links, as an interconnect between individual stand alone systems, typically through an interconnect module or a network switch. This interconnect scheme by using only PCIE based protocols for data transfer over direct physical connection links between the PCIE based peripheral devices, (see FIG. 1), with out any intermediate conversion of the transmitted data stream to other data transmission protocols or encapsulation of the transmitted data stream within other data transmission protocols, reduces the latencies of communication in a cluster. The PCIE standard based peripheral at a peripheral end point of the system, by directly connecting using PCIE standard based peripheral to PCIE standard based peripheral direct data link connections to the PCIE standard based peripheral at the switch, provides for increase in the number of links per connection as band width needs increase and thereby allow scaling of the band width available within any single interconnect or the system of interconnects.

Some Advantages of the Proposed Connection Scheme:
1. Reduced Latency of Data transfer as conversion from PCIE to other protocols like ethernet is avoided during transfer.
2. The number of links per connection can scale from X1 to larger numbers X32 or even X64 possible based on the bandwidth needed.
3. Minimum change in interconnect architecture is needed with increased bandwidth, enabling easy scaling with need.
4. Standardization of the PCIE based peripheral will make components easily available from multiple vendors, making the implementation of interconnect scheme easier and cheaper.
5. The PCIE based peripheral to PCIE based peripheral links in connections allow ease of software control and provide reliable bandwidth.

EXPLANATION OF NUMBERING AND LETTERING IN THE FIG. 1

(1) to (8): Number of Systems interconnected in FIG. 1
(9): Switch sub-system.
(10): Software configuration and control input for the switch.
(1a) to (8a): PCI Express based peripheral module (PCIE Modules) attached to systems.
(1b) to (8b): PCI Express based peripheral modules (PCIE Modules) at switch.
(1L) to (8L): PCIE based peripheral module to PCIE based peripheral module connections having n-links (n-data links)

EXPLANATION OF NUMBERING AND LETTERING IN THE FIG. 2

(12-1) and (12-2): clusters
(9-1) and (9-2): interconnect modules or switch sub-systems.
(10-1) and (10-2): Software configuration inputs
(11-1) and (11-2): Switch to switch interconnect module in the cluster
(11L): Switch to switch interconnection

DESCRIPTION OF THE INVENTION

PCI Express is a Bus or I/O interconnect standard for use inside the computer or embedded system enabling faster data transfers to and from peripheral devices. The standard is still evolving but has achieved a degree of stability such that other applications can be implemented using PCIE as basis. A PCIE based interconnect scheme to enable switching and interconnection between external systems, such that the scalability can be applied to enable data transport between connected systems to form a cluster of systems is proposed. These connected systems can be any computing or embedded system. The scalability of the interconnect will allow the cluster to grow the bandwidth between the systems as they become necessary without changing to a different connection architecture.

Figure 1:
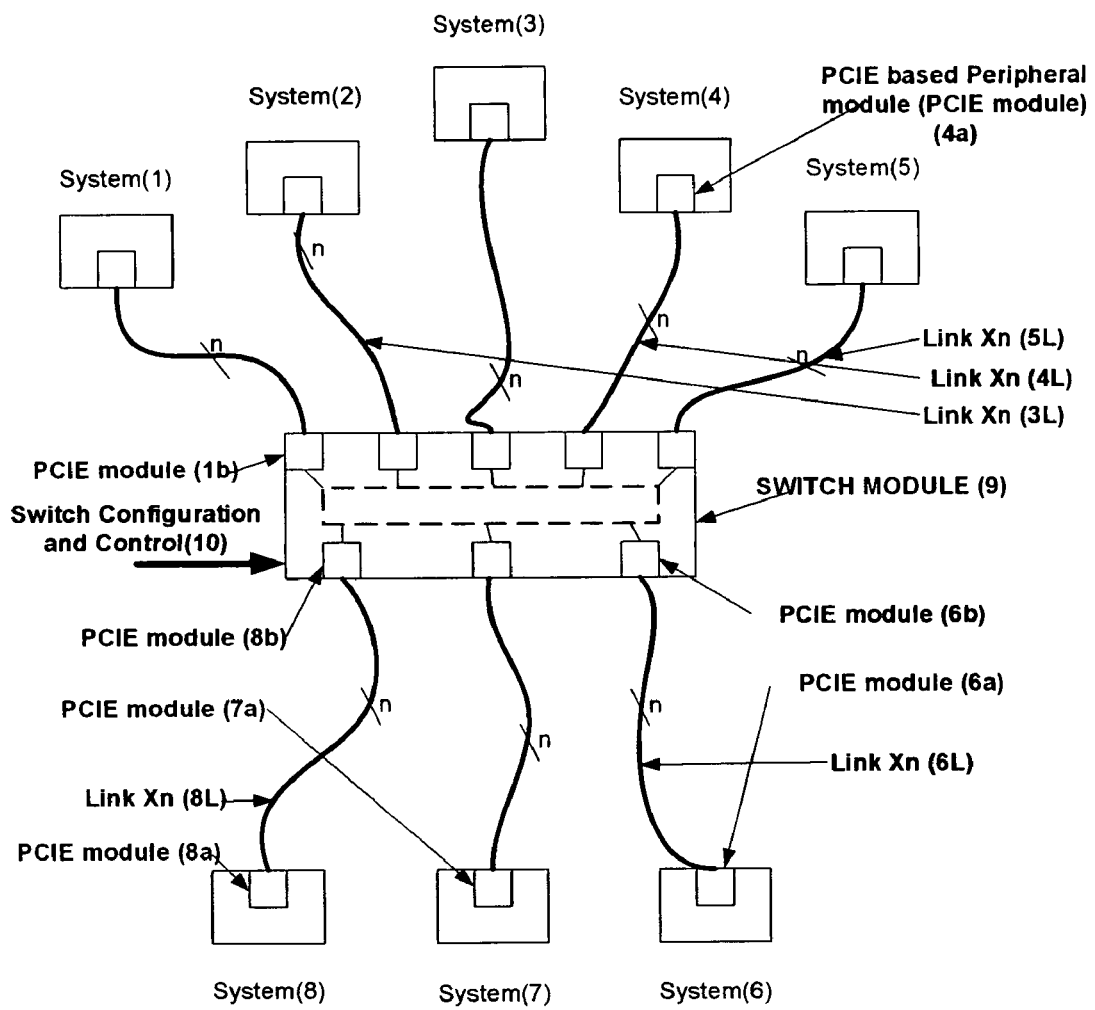
FIG. 1 Typical Interconnected (multi-system) cluster (shown with eight systems connected in a star architecture using direct connected data links between PCIE standard based peripheral to PCIE standard based peripheral)

FIG. 1 is a typical cluster interconnect. The Multi-system cluster shown consist of eight units or systems {(1) to (8)} that are to be interconnected. Each system has a PCI express (PCIE) based peripheral module {(1a) to (8a)} as an IO module, at the interconnect port, with n-links built into or attached to the system. (9) is an interconnect module or a switch sub-system, which has number of PCIE based interconnect modules equal to or more than the number of systems to be interconnected, in this case of FIG. 1 this number being eight {(1b) to (8b)}, that can be interconnected for data transfer through the switch. A software based control input is provided to configure and/or control the operation of the switch. Link connections {(1L) to (8L)} attach the PCIE based peripheral modules on the respective systems to those on the switch with n links. The value of n can vary depending on the connect band width required by the system.

When data has to be transferred between say system 1 and system 5, in the simple case, the control is used to establish an internal link between PCIE based peripheral modules 1b and 5b inside the switch. The hand shake is established between outbound PCIE based peripheral module (PCIE Module) 1a and inbound PCIE module 1b and outbound PCIE module 5a and inbound PCIE module 5b. This provides a through connection between the PCIE modules 1a to 5b through the switch allowing data transfer. Data can then be transferred at speed between the modules and hence between systems. In more complex cases data can also be transferred and qued in storage implemented in the switch and then when links are free transferred out to the right systems at speed.

Multiple systems can be interconnected at one time to form a multi-system that allow data and information transfer and sharing through the switch. It is also possible to connect smaller clusters together to take advantage of the growth in system volume by using an available connection scheme that interconnects the switches that form a node of the cluster.

If need for higher bandwidth and low latency data transfers between systems increase, the connections can grow by increasing the number of links connecting the PCIE modules between the systems in the cluster and the switch without completely changing the architecture of the interconnect. This scalability is of great importance in retaining flexibility for growth and scaling of the cluster.

It should be understood that the system may consist of peripheral devices, storage devices and processors and any other communication devices. The interconnect is agnostic to the type of device as long as they have a PCIE module at the port to enable the connection to the switch. This feature will reduce the cost of expanding the system by changing the switch interconnect density alone for growth of the multi-system.

PCIE is currently being standardized and that will enable the use of the existing PCIE modules to be used from different vendors to reduce the over all cost of the system. In addition using a standardized module in the system as well as the switch will allow the cost of software development to be reduced and in the long run use available software to configure and run the systems.

As the expansion of the cluster in terms of number of systems, connected, bandwidth usage and control will all be cost effective, it is expected the over all system cost can be reduced and over all performance improved by standardized PCIE module use with standardized software control.

Typical connect operation may be explained with reference to two of the systems, example system (1) and system (5). System (1) has a PCIE module (1a) at the interconnect port and that is connected by the connection link or data-link or link (1L) to a PCIE module (1b) at the IO port of the switch (9). System (5) is similarly connected to the switch trough the PCIE module (5a) at its interconnect port to the PCIE module (5b) at the switch (9) IO port by link (5L). Each PCIE module operates for transfer of data to and from it by standard PCI Express protocols, provided by the configuration software loaded into the PCIE modules and switch. The switch operates by the software control and configuration loaded in through the software configuration input.

Figure 2:
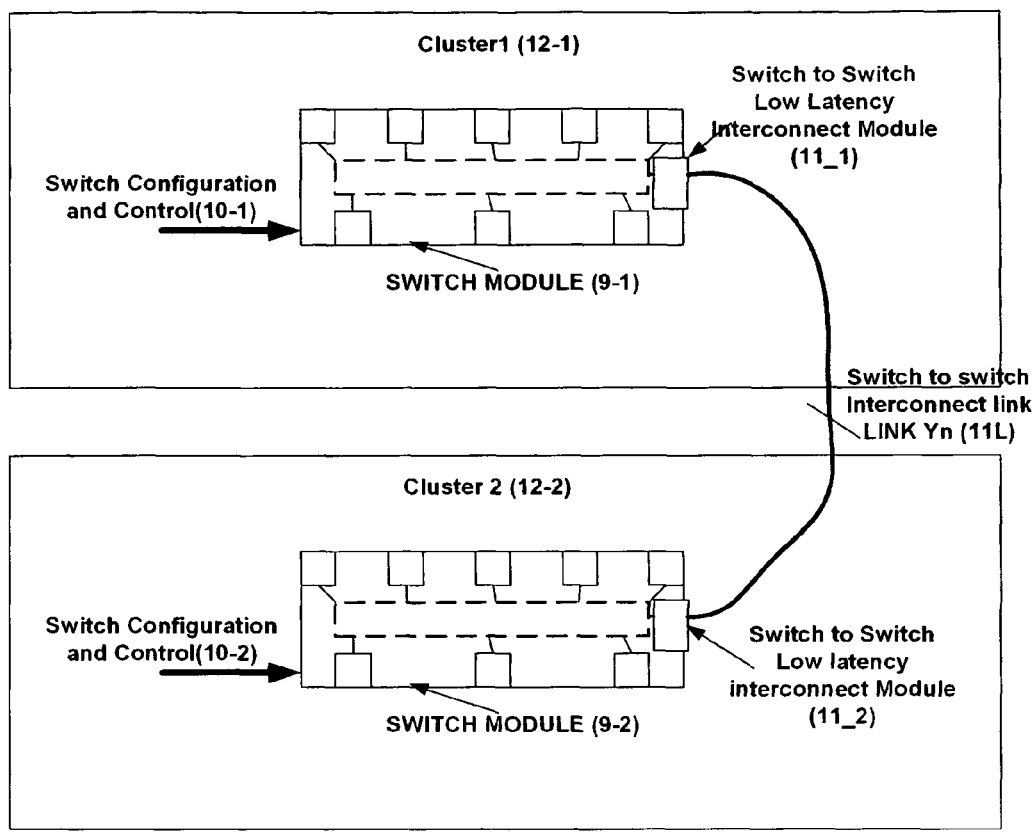
FIG. 2 A cluster using multiple interconnect modules or switches to interconnect smaller clusters.

FIG. 2 is that of a multi-switch cluster. As the need tom interconnect larger number of systems increase, it will be optimum to interconnect multiple switches of the clusters to form a new larger cluster. Such a connection is shown in FIG. 2. The shown connection is for two smaller clusters (12-1 and 12-2) interconnected using PCIE modules that can be connected together using any low latency switch to switch connection (11-10 and 11-2), connected using interconnect links (11L) to provide sufficient band width for the connection. The switch to switch connection transmits and receives data and information using any suitable protocol and the switches provide the interconnection internally through the software configuration loaded into them.

The following are some of the advantages of the disclosed interconnect scheme

1. Provide a low latency interconnect for the cluster.
2. Use of PCIExpress based protocols for data and information transfer within the cluster.
3. Ease of growth in bandwidth as the system requirements increase by increasing the number of links within the cluster.
4. Standardized PCIE component use in the cluster reduce initial cost.
5. Lower cost of growth due to standardization of hardware and software.
6. Path of expansion from a small cluster to larger clusters as need grows.
7. Future proofed system architecture.

In fact the disclosed interconnect scheme provides advantages for low latency multi-system cluster growth that are not available from any other source.

What is claimed is:

1. A network switch enabled for communication between a plurality of computers in a cluster wherein each computer is not a PCI-Express peripheral device;
    said network switch comprise a plurality of ports,
    wherein each port in a first set of ports of said plurality of ports is connected to a computer of said plurality of computers using a PCI Express link, forming said cluster;
    a data transfer mechanism to transfer data to and from each of said first set of ports to the computer connected to that port, wherein said data transfer is done using a PCI-Express protocol;
    a switching mechanism in said network switch enabled to transfer data at least between a first port of said first set of ports, on said network switch and any of a rest of said first set of ports, on the network switch;
    wherein said switching mechanism and said data transfer mechanism together allow data received from the computer connected to said first port to be sent to any of said rest of said plurality of computers; and
    wherein said switching mechanism and said data transfer mechanism together allows data received from any of said rest of said plurality of computers to be sent to said computer connected to said first port;
    enabling interconnection and communication within said cluster, between said first of said plurality of computers and any of said rest of said plurality of computers, over said PCI Express Links using PCI Express Protocol.

2. The network switch of claim 1, wherein said data transfer mechanism and switching mechanism in said network switch further enable data transfer between any of said plurality of computers connected to said plurality of ports on said network switch enabling communication between said plurality of computers over said PCI Express Links using PCI Express Protocol.

3. The network switch of claim 1, wherein at least one of said plurality of ports is an interconnection port enabled to connect to a second interconnection port on a second network switch, similar in all respects to the network switch of claim 1.

4. The connection of claim 3, wherein said interconnection port on said network switch and said second interconnection port on said second network switch, is using PCI Express links.

5. The network switch of claim 3, wherein said switching mechanism further enabled to transfer data between said interconnection port on said network switch and any other of said plurality ports, also on said network switch.

6. The network switch of claim 3, wherein said data transfer mechanism further enabled to transfer data between said interconnection port on said network switch and said second interconnection port on said second network switch connected to it.

7. The data transfer mechanism of claim 6, wherein said transfer of data between said network switch and said second network switch over PCI Express links is using PCI Express Protocol.

8. A system for communication between a plurality of computers using network switches wherein each computer is not a PCI-Express peripheral device, and wherein the system comprise:
- a plurality of network switches;
  - each of said plurality of network switches having a plurality of ports;
  - at least one of said plurality of ports on each of said plurality of network switches being an interconnection port;
  - each of said interconnection port on each of said plurality of network switches enabled to connect to another of said interconnection port on any another of said plurality of network switches, forming interconnected network switches, using PCI Express links;
  - a data transfer mechanism enabled to transfer data between any of said connected interconnection ports, wherein said data transfer is done using a PCI-Express protocol;
  - each of said plurality of computers connected to one of said plurality of ports, excluding said interconnection ports, of said plurality of network switches using PCI Express links;
  - said plurality of network switches with said plurality of computers connected to it forming a cluster of connected computers;
  - said data transfer mechanism further enabled to transfer data to and from each one of said plurality of ports to said one of said plurality of computers connected to it, wherein said data transfer is done using a PCI-Express protocol; and
  - a switching mechanism, on each of said plurality of network switches, enabled to transfer data between at least a first of said plurality of ports, on each of said plurality of network switches, and any other of said plurality of ports, on said network switch;
  - such that said data transfer mechanism and said switching mechanism together enable data communication within and between said clusters of connected computers through said interconnected network switches.

9. The system of claim 8, wherein the system enabling interconnecting and data communication between computers connected in multiple clusters, create a super cluster of connected computers.

10. The system of claim 9, wherein said data communication between computers connected in said super cluster is over PCI Express links, using PCI Express protocols.

11. The system of claim 8, wherein the data transfer mechanism is enabled to transfer data between a third interconnection port on a first network switch to a fourth interconnect port on a second network switch.

12. The system in claim 8, wherein said switching mechanism, on each of said plurality of network switches, enabled to transfer data between any of said plurality ports, on each of said plurality of network switches, and any other of said plurality
of ports, on said network switch, including said interconnection port.

13. A network switch used for interconnecting a plurality of computers in a cluster,
- wherein each computer is not a PCI-Express peripheral device, and wherein said cluster comprising: said plurality of interconnected computers and said network switch, wherein said network switch enables communication between said interconnected computers;
- said network switch comprising:
- at least a first port wherein said first port is connected to a first computer using a PCI-Express link;
- at least a second port wherein said second port is connected to a second computer using PCI-Express link;
- a data transfer mechanism enabled to transfer data to and from said first computer to said first port wherein said data transfer is done using PCI-Express protocol;
- said data transfer mechanism further enabled to transfer data to and from said second computer to said second port, wherein said data transfer is done using PCI-Express protocol;
- a switching mechanism enabled to transfer data between said first port and said second port on said network switch;
- such that said switching mechanism together with said data transfer mechanism allow data transfer and hence communication between the plurality of computers in the cluster.

* * * * *